(12) United States Patent
Linder et al.

(10) Patent No.: US 6,659,060 B2
(45) Date of Patent: Dec. 9, 2003

(54) CRANKSHAFT DRIVE FOR AN INTERNAL-COMBUSTION ENGINE

(75) Inventors: Alfons Linder, Pforzheim (DE); Johannes Krauss, Ludwigsburg (DE)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/897,781

(22) Filed: Jun. 29, 2001

(65) Prior Publication Data

US 2002/0017263 A1 Feb. 14, 2002

(30) Foreign Application Priority Data

Jul. 1, 2000 (DE) .......................................... 100 32 095

(51) Int. Cl.[7] .............................................. F02B 75/06
(52) U.S. Cl. ...................................... 123/192.2; 74/603
(58) Field of Search .......................... 123/192.2, 192.1, 123/197.4, 197.3; 74/603, 604

(56) References Cited

U.S. PATENT DOCUMENTS

| | | | |
|---|---|---|---|
| 4,300,493 A | | 11/1981 | Berti |
| 4,617,885 A | | 10/1986 | Oshiro et al. |
| 4,656,981 A | * | 4/1987 | Maurata et al. .......... 123/192.2 |
| 4,741,303 A | * | 5/1988 | Kronich .................... 123/192.2 |
| 5,305,656 A | * | 4/1994 | Kamiya et al. ........... 123/192.2 |
| 5,850,764 A | | 12/1998 | Bostelmann et al. |
| 6,371,071 B1 | * | 4/2002 | Iwata ....................... 123/192.2 |
| 6,394,058 B2 | * | 5/2002 | Fegg ....................... 123/195 C |

FOREIGN PATENT DOCUMENTS

| DE | 3141025 A1 | 6/1982 |
|---|---|---|
| EP | 0640776 | 4/1998 |

* cited by examiner

Primary Examiner—Hieu T. Vo
Assistant Examiner—Hyder Ali
(74) Attorney, Agent, or Firm—Michael Best & Friedrich LLP

(57) ABSTRACT

A crankshaft drive for an internal-combustion engine includes a crankshaft, a connecting rod assembly coupled to the crankshaft, and a balancing shaft arranged parallel to the crankshaft and at a distance r from the crankshaft. A balancing weight extends from the balancing shaft for balancing mass forces caused by the rotation of the crankshaft. A recess is formed in the balancing weight, so that during rotation of the balancing shaft, the balancing weight does not interfere with the rotating crankshaft and connecting rod assembly. The inclusion of the recess allows the distance r between the crankshaft and the balancing shaft to be reduced. Preferably, a rib is formed on one side of the balancing shaft to strengthen the balancing shaft.

24 Claims, 5 Drawing Sheets

CRANKSHAFT DRIVE FOR AN INTERNAL-COMBUSTION ENGINE

FIELD OF THE INVENTION

The invention relates to a crankshaft drive for an internal-combustion engine and a method of making a crankshaft for an internal combustion engine, in particular for a motorcycle.

BACKGROUND OF THE INVENTION

It is known from the prior art to balance an internal-combustion engine having a V-shaped arrangement of cylinders with a balancing shaft provided with a balancing weight for the balancing of first-order masses. In particular, U.S. Pat. No. 5,850,764 issued to Bosetelmann et al discloses mounting a balancing weight parallel to the crankshaft. However, because of the distance between the balancing shaft and the crankshaft, an undesirable additional residual moment is produced which causes corresponding oscillation excitation of the engine, in particular at higher speeds. To eliminate this residual moment, U.S. Pat. No. 5,850,764 proposes an additional shaft which is arranged in the cylinder head and exerts about the crankshaft a moment of equally great magnitude, but acting in the opposite direction to the residual moment of the balancing shaft. However, the additional structural measures necessitated by the inclusion of the balancing shaft take up additional space within the engine. Also, the balancing shaft is subjected to mass forces and may bend or deform the balancing shaft.

SUMMARY OF THE INVENTION

The present invention provides an improved motorcycle engine having a crankshaft, a balancing shaft substantially parallel to the crankshaft, a balancing weight coupled to the balancing shaft, and a recess in the balancing weight which allows the connecting rod to clear the balancing weight as the crankshaft and the connecting rod rotate. The inclusion of the recess in the balance weight makes it possible to reduce the distance between the balancing shaft and the crankshaft without allowing the connecting rod to contact the balancing weight during operation of the engine. This in turn reduces the residual moment caused by the balancing shaft and the balancing weight. As a result of this measure, additional, structurally complex measures for reducing the residual moment can advantageously be dispensed with. Additionally, there is a corresponding reduction in the space required for the crankshaft and the balancing shaft.

In one aspect of the present invention, an inexpensive balancing shaft is formed by machining a balancing shaft from a single piece of material. Preferably, an output gear is press fit onto one end of the balancing shaft. The opposite end of the balancing shaft is machined to form a bearing journal. A balancing weight can then be welded onto one side of the balancing shaft. Finally, a recess is machined into one side of the balancing shaft. This recess allows the connecting rods to rotate along their path, constrained by the crankshaft, without contacting the balancing weight or the balancing shaft.

The balancing shaft is preferably rotated by the output gear. The output gear is itself driven by the drive gear, which is preferably coupled directly to the crankshaft. In other embodiments of the present invention, the balancing shaft can be driven in other ways using other elements and configurations of those elements, including intermediate gears, chains, belts, and the like. These other configurations are well known in the art of internal-combustion engine design and are not described in greater detail herein.

In another aspect of the present invention, the recess extends from the balancing weight into the balancing shaft. In this aspect, there is a relatively large recess in the balancing shaft, thereby allowing a greater reduction in the distance between the balancing shaft and the crankshaft.

A rib is preferably formed on one side of the balancing shaft to provide the balancing shaft with additional resistance to bending and deformation. Most preferably, the rib is located between the bearing journals, thereby strengthening the balancing shaft at the weakest point. The rib preferably has a recess through which the connecting rod can pass without contacting the rib. Further advantageous embodiments and improvements of the crankshaft drive and methods of using the crankshaft drive according to the invention for an internal-combustion engine are described below.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized to result in embodiments which are still within the spirit and scope of the present invention.

In the drawings, wherein like reference numerals indicate like parts.

DETAILED DESCRIPTION OF THE ILLUSTRATED EMBODIMENTS

The present invention is described herein as being used with a V-shaped internal-combustion engine. One having ordinary skill in the art will appreciate that the present invention can be used with V-shaped engines and with in-line or straight engines with equal effectiveness. Similarly, the engine is described herein as a two-cylinder engine. However, the present invention can also be used with engines having one, three or four cylinders. As such, the present invention can include embodiments in which the configuration of the engine includes any conventional motorcycle engine and is not limited to the embodiments referred to herein. For simplicity only, the following description will continue to refer to two cylinder, V-shaped engines.

Figure 1:
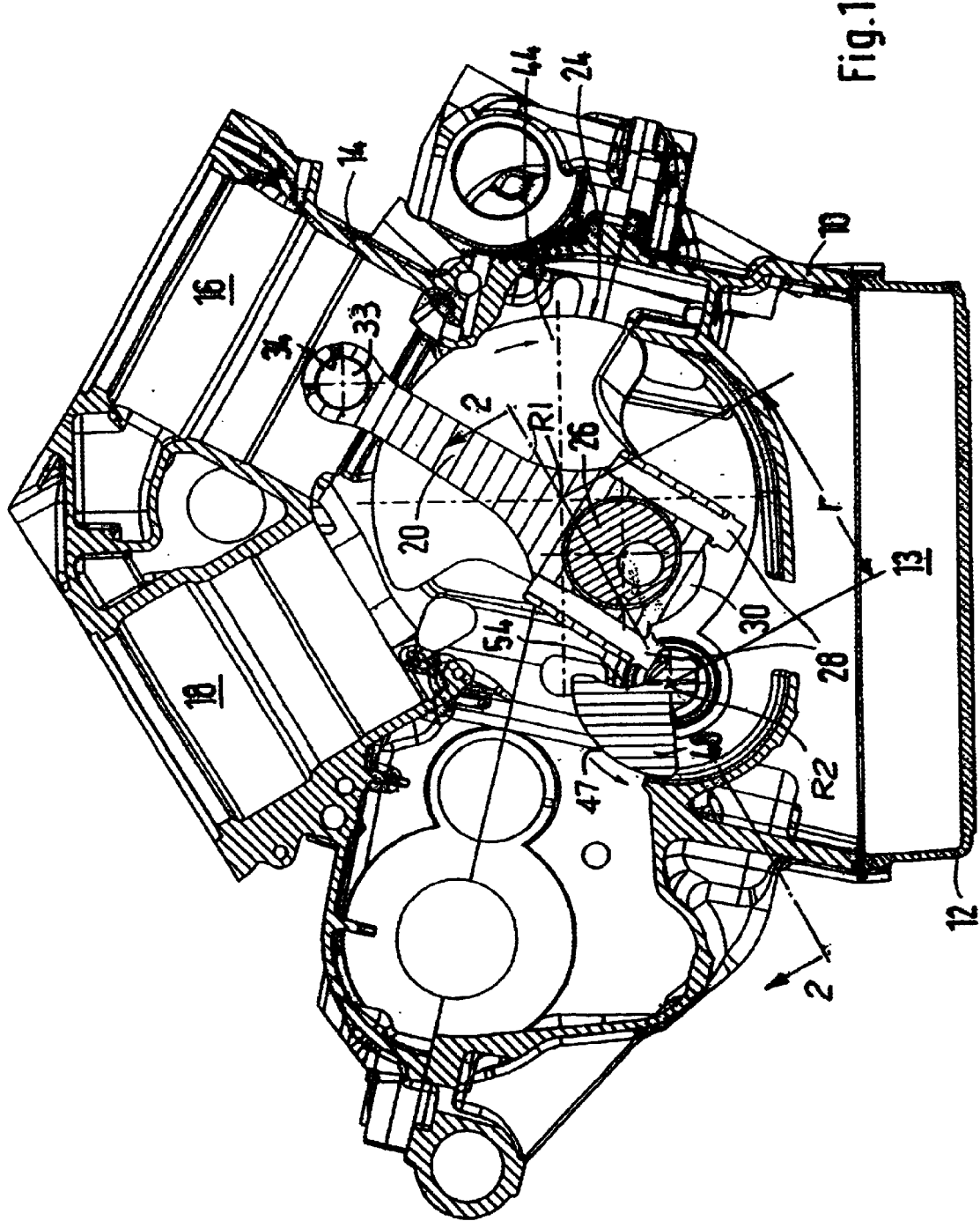
FIG. 1 shows a vertical cross-section through the crankcase of an internal-combustion engine.
Figure 2:
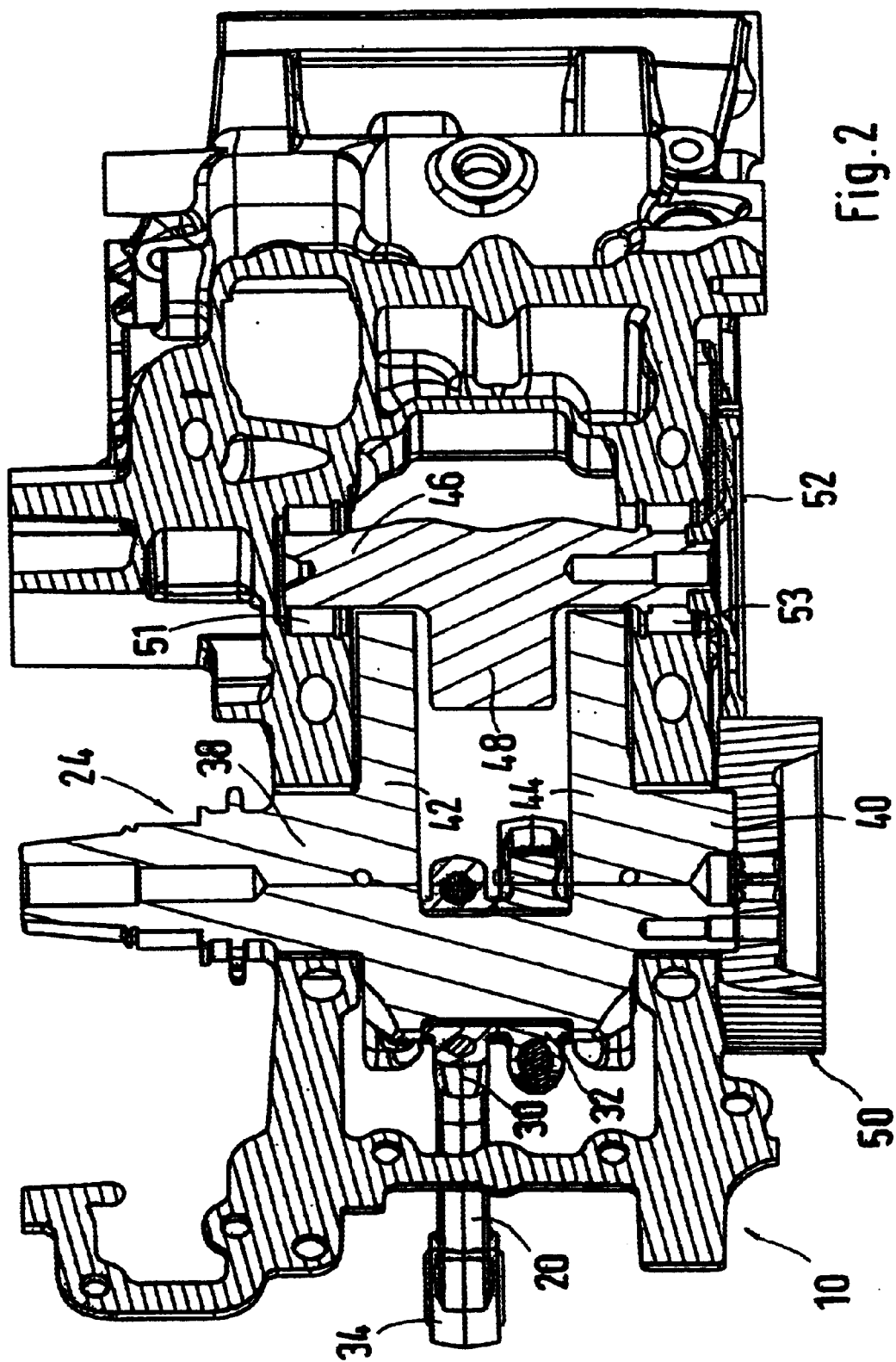
FIG. 2 shows a horizontal section through the internal-combustion engine taken along line 2—2 of FIG. 1.

The present invention relates to crankshafts for internal-combustion engines and particularly for balancing motorcycle crankshafts. With reference to FIG. 1, the two-part crankcase of the internal-combustion engine has a lower crankcase half 10 at the lower end of which is an oil sump 12 comprising an oil collecting chamber 13 for collecting the lubricating oil. Two cylinders 16, 18 of the internal-combustion engine, formed as a V-shaped engine, are incorporated into the upper crankcase half 14. The pistons (not shown) arranged in the cylinders 16, 18 are connected to a crankshaft 24 via connecting rods 20, 22. The big ends 30, 32 of the two connecting rods 20, 22 are fixed to the crankshaft journal 26 by fasteners 28, while the connecting-rod eyes 34, 36 are connected to the pistons of the internal-combustion engine by piston pins 33. The connecting rods 20, 22 and the fasteners 28 together define respective connecting rod assemblies.

The crankshaft 24 has two bearing journals 38 and 40 mounted in main bearings (not shown) in the crankcase. Furthermore, two crankshaft webs 42, 44 are arranged on the crankshaft 24 as counterweights for balancing the rotating and oscillating inertia forces. In other embodiments of the present invention, any other number of webs 42, 44 may be used, as required by the particular engine.

The oscillation of the webs 42, 44 causes periodically variable forces which, when of the first order, rotate at crankshaft speed. The forces caused by the rotation of the webs 42, 44 are balanced by a balancing shaft 46, which is also mounted in the crankcase and provided with a corresponding balancing weight 48. The balancing shaft 46 is driven via the crankshaft 24 and rotates at the same speed, but in the opposite direction to the crankshaft 24. The weight of the crankshaft webs 42, 44 and the balancing weight 48 of the balancing shaft 46 are coordinated so that the rotating and oscillating masses of the webs 42, 44 are substantially balanced.

Figure 3:
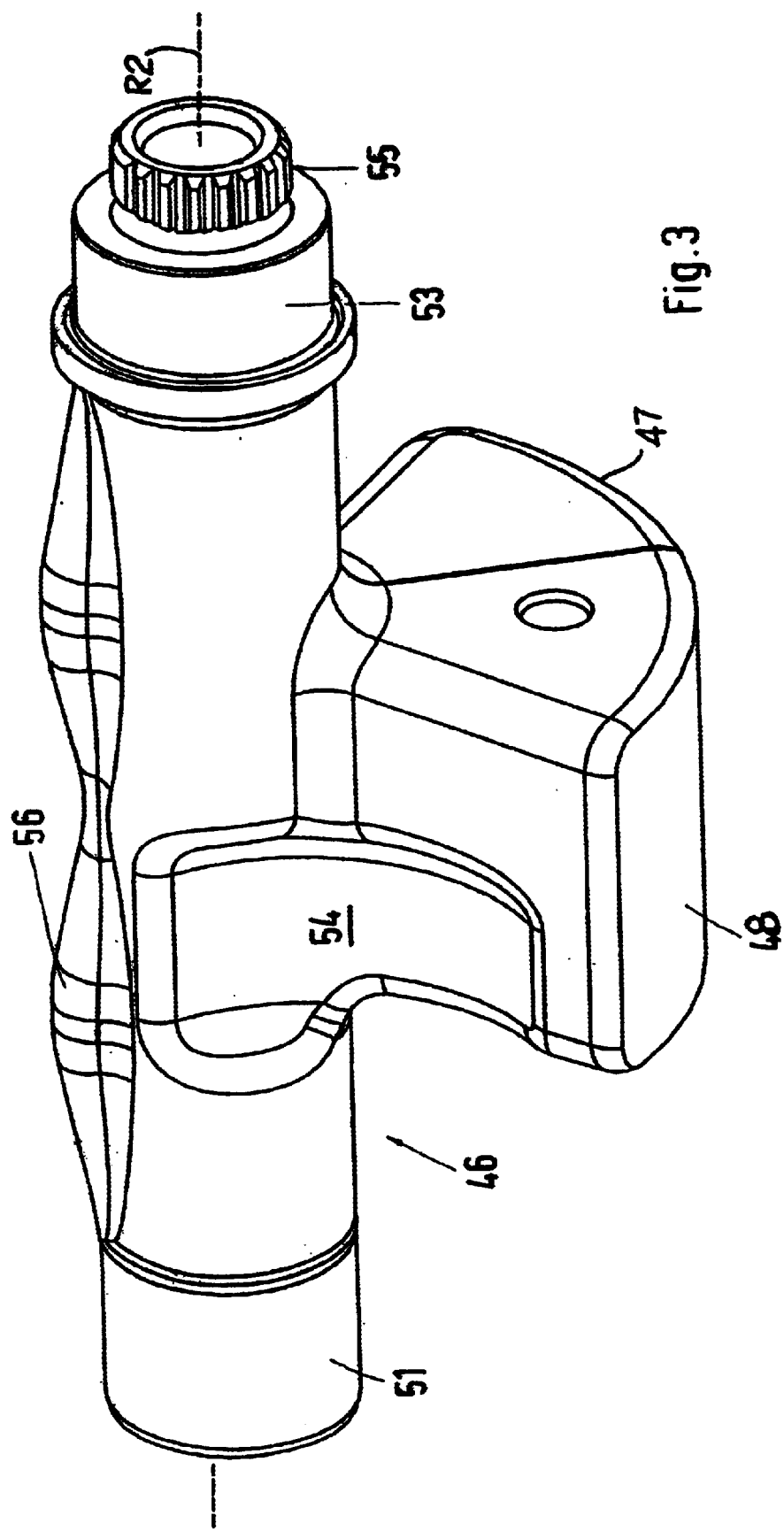
FIG. 3 shows a perspective view of a balancing shaft.

For driving the balancing shaft 46, a drive gear 50 is arranged on the crankshaft 24, and an output gear 52 meshing with the drive gear 50 is arranged on the balancing shaft 46. The balancing shaft 46 has two bearing journals 51, 53 that are mounted in the crankcase. The bearing journals 51, 53 are machined to receive two pressure fit bearings to reduce the friction caused when the balancing shaft 46 rotates within the crankcase. With reference to FIG. 3, one end 55 of the balancing shaft 46 is machined next to the bearing journal 53 to provide positive mounting for an output gear 52. The output gear 52 is mounted on the machined end 55 of the balancing shaft 46 to more securely fasten the output gear 52 to the balancing shaft 46. Alternatively, the output gear 52, the balancing shaft 46, the bearing journals 51, 53, the balancing weight 48, or any combination thereof can be machined from a single piece of bar stock, thus eliminating the need for an additional assembly step. The output gear 52 is preferably driven directly via the drive gear 50 but may alternatively be driven via one or more intermediate gears. Similarly, a chain or belt can also be used to drive the output gear 52.

A first rotational axis R1 extends through the crankshaft, and the rotation of the crankshaft 24 is defined as rotation about the first rotational axis R1. A second rotational axis R2 extends through the balancing shaft 46 and is arranged parallel to and at a distance r from the first rotational axis R1. In order to be able to arrange the balancing shaft 46 at as small a distance r from the rotational axis R1 of the crankshaft 24 as possible, a recess 54 is provided in the balancing weight 48 of the balancing shaft 46.

Referring to FIG. 3, the recess 54 in the balancing weight 48 is relatively small, extending into the balancing weight 48 only as far as is necessary to allow the connecting rods 30, 32 to clear the balancing weight 48 as the crankshaft 24 rotates about the first rotational axis R1. In the illustrated embodiment, the recess extends from the balancing weight 48 into the balancing shaft 46 so that the balancing shaft 46 can be mounted even more closely to the crankshaft 24. The recess 54 is arcuately shaped, extending from the balancing weight 48 into the balancing shaft 46. The balancing weight 48 is relatively triangular when viewed from the side, widening as the balancing weight 48 extends from the balancing shaft 46. The balancing weight has an arcuately shaped face 47. The radius of this arcuate face is preferably proportional to the radius of the balancing shaft 46.

Figure 4:
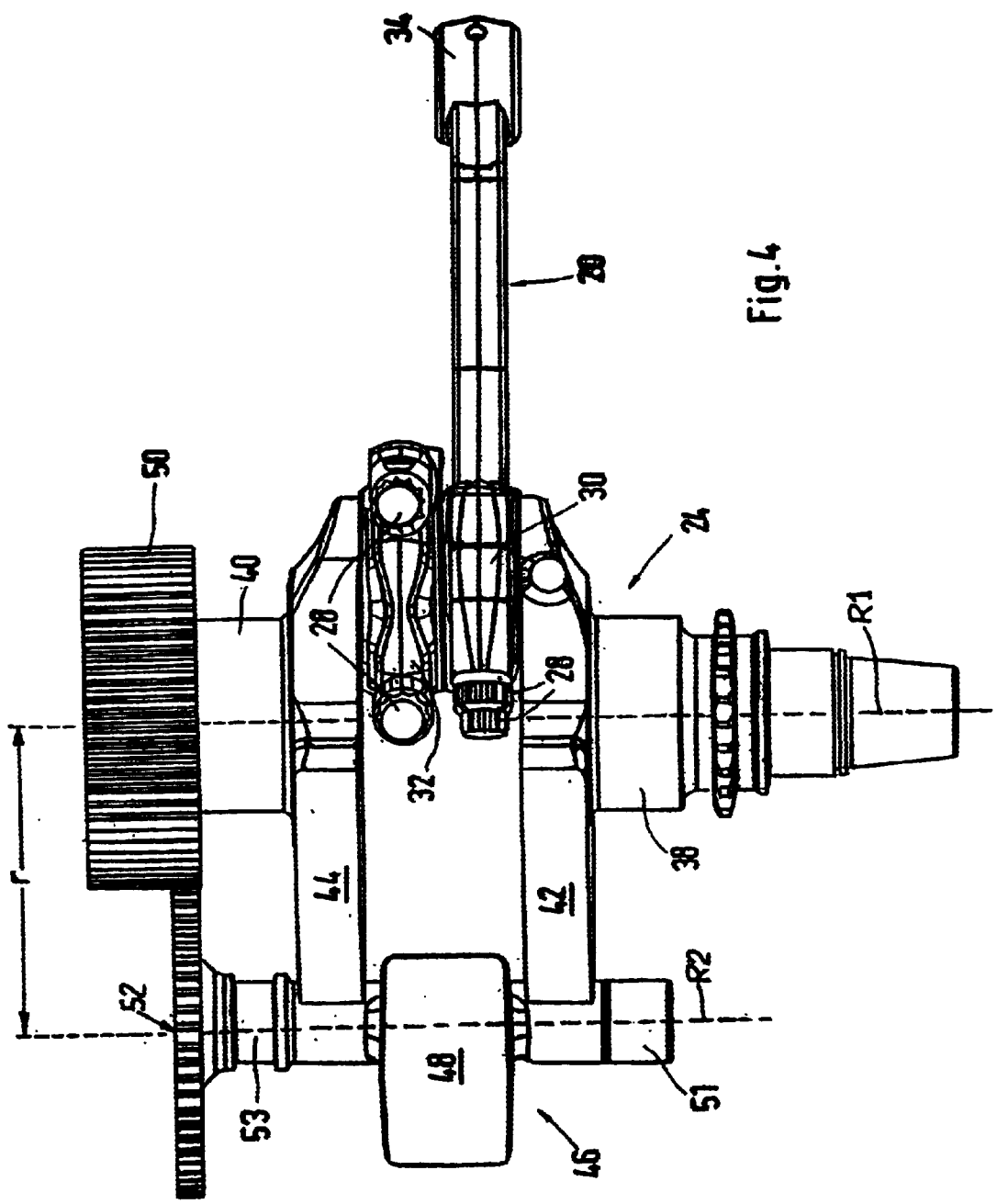
FIGS. 4 and 5 show two different rotational positions of the crankshaft relative to the balancing shaft.
Figure 5:
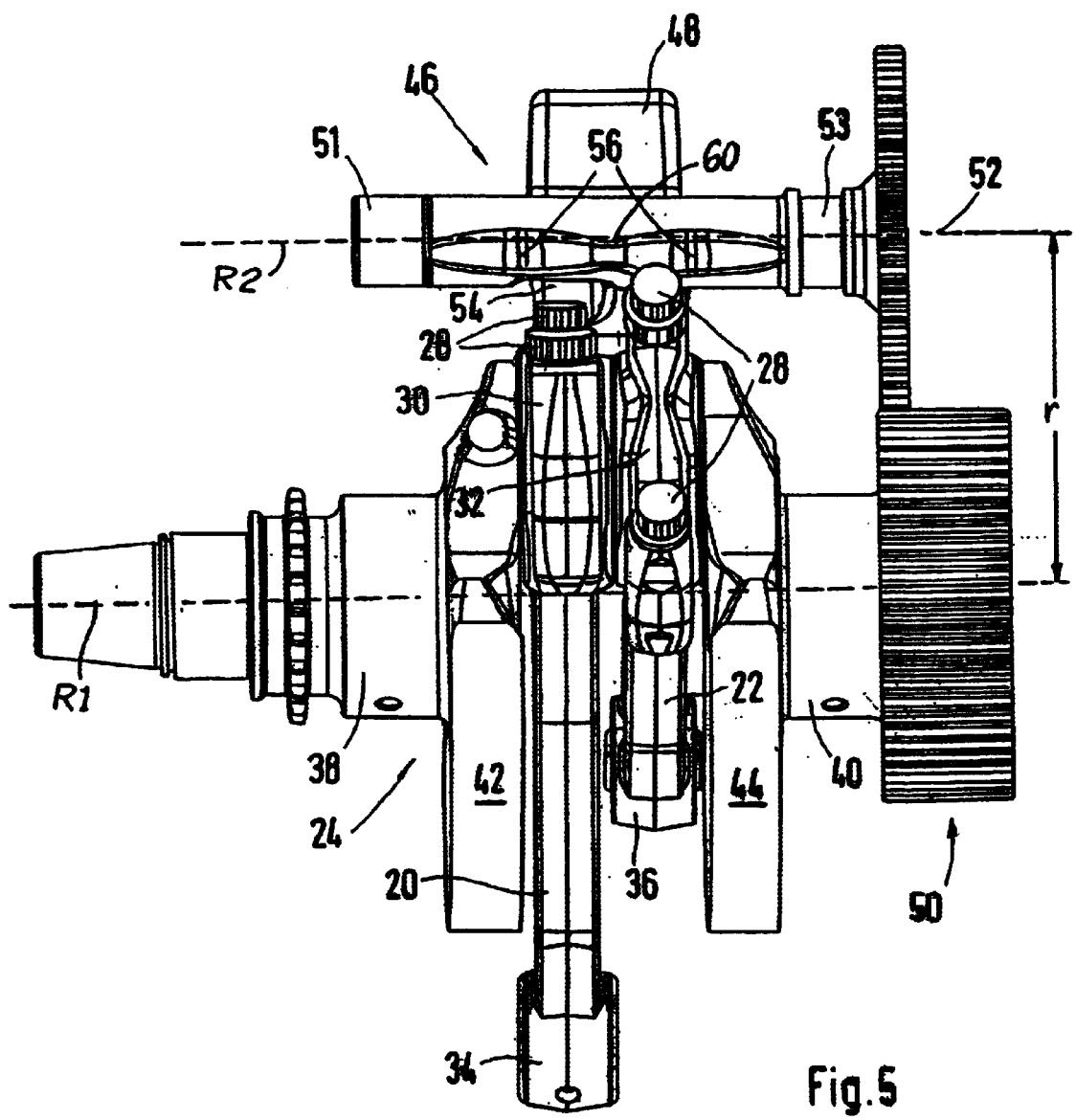

As shown in FIGS. 4 and 5, the balancing weight 48 of the balancing shaft 46 is arranged between the two rotating crankshaft webs 42, 44 so that the balancing weight 48 can rotate about the second rotational axis R2 and between the two crankshaft webs 42, 44 without contacting the crankshaft 24 or the crankshaft webs 42, 44. The distance between the crankshaft 24 and the balancing shaft 46 is determined by the distance that the big end 30 and the fasteners 28 extend from the crankshaft journal 26. The balancing shaft 46 should be sufficiently spaced from the crankshaft 24 so that when the balancing weight 48 rotates it does not interfere with the crankshaft webs 42, 44, the big ends of the connecting rod 30, 32, or the fasteners 28. In the present invention, the distance between the crankshaft 24 and the balancing shaft 46 can be reduced because the arc-shaped recess 54 in the balancing weight 48 allows the crankshaft 24 to rotate about the first axis R1. without contacting the balancing shaft 46 or the balancing weight 48. In particular, the fasteners 28 and the big ends of the connection rods 30, 32 can pass through the recess 54 in the balancing shaft 46. The arcuately-shaped contour of the recess 54 is adapted to the rotational motion of the big end 30 and the fasteners 28 about the first rotational axis R1. During the rotational movement of the crankshaft 24, the big end 30 and the fasteners 28 can pass partially through the recess 54, as shown in FIG. 1, without impeding the rotation of the crankshaft 24 and the balancing shaft 46.

As best seen in FIGS. 3 and 5, ribs 56 are arranged on the balancing shaft 46 and extend substantially parallel to the second rotational axis R2. Depending upon the particular application, one or more ribs 56 may be formed on the balancing shaft 46. FIG. 3 shows a single rib 56 fastened on one side of the balancing shaft 46. In other embodiments, two or more ribs 56 may be formed on the balancing shaft 46. The ribs 46 strengthen the balancing shaft 46 against bending and deformation experienced during rotation about the second rotational axis R2. The ribs 56 preferably extend between the bearing journals 51, 53, thereby strengthening the balancing shaft 46 at the weakest point. In embodiments in which a single rib 56 is used, a recess 60 (see FIG. 3) is preferably located in the rib 56 to allow the connecting rods 30, 32 to clear the rib without contacting any part of the rib 56.

The embodiments described above and illustrated in the drawings are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, while various elements and assemblies of the present invention are described as being used with the crankshaft 24 having two webs 42, 44, one having ordinary skill in the art will appreciate that the present invention can also be used with engines having one, three, four, or any other numbers of webs. As such, the functions of the various elements and assemblies of the present invention can be changed to a significant degree without departing from the spirit and scope of the present invention.

We claim:

1. A motorcycle comprising:
   a front wheel;
   a rear wheel;
   a frame supported by the wheels; and
   a engine supported by the frame, the engine including:
   a crankshaft;
   a connecting rod assembly coupled at one end to the crankshaft; and
   a balancing shaft having a balancing weight extending radially therefrom for rotation with the balancing shaft, the balancing weight having a recess defined therein such that when the crankshaft rotates the recess provides clearance for the connecting rod assembly so the connecting rod assembly does not substantially interfere with the balancing weight.

2. A motorcycle as claimed in claim 1, wherein the recess is arcuately shaped.

3. A motorcycle as claimed in claim 1, wherein the recess extends into the balancing shaft.

4. A motorcycle as claimed in claim 1, wherein the balancing weight is integral with the balancing shaft.

5. A motorcycle as claimed in claim 1, further including a second connecting rod assembly connected at one end to the crankshaft.

6. A motorcycle as claimed in claim 1, wherein the balancing shaft is coupled to the crankshaft so that rotation of the crankshaft drives rotation of the balancing shaft.

7. A motorcycle as claimed in claim 1, further comprising a rib integral with the balancing shaft.

8. A motorcycle as claimed in claim 7, further comprising a recess in the rib such that when the crankshaft and balancing shafts rotate, the recess provides clearance for the connecting rod assembly so that the connecting rod assembly does not substantially interfere with the rib.

9. The motorcycle of claim 1, wherein:
   the crankshaft rotates about a first rotational axis;
   the balancing shaft rotates about a second rotational axis spaced a distance r from the first rotational axis; and
   the distance r is such that the connecting rod assembly would interfere with the balancing weight during rotation of the crankshaft if the recess was eliminated.

10. A motorcycle as claimed in claim 9, wherein the first and the second rotational axes are substantially parallel.

11. A motorcycle as claimed in claim 1, wherein the connecting rod defines a path during rotation of the crankshaft, the path passing through at least a portion of the recess.

12. An internal combustion engine for a motorcycle, the engine comprising:
   a crankshaft;
   a connecting rod assembly coupled at one end to the crankshaft; and
   a balancing shaft having a balancing weight extending radially therefrom for rotation with the balancing shaft, the balancing weight having a recess defined therein such that when the crankshaft rotates, the recess provides clearance for the connecting rod assembly so the connecting rod assembly does not substantially interfere with the balancing weight.

13. An engine as claimed in claim 12, wherein the recess is arcuately shaped.

14. An engine as claimed in claim 12, wherein the recess extends into the balancing shaft.

15. An engine as claimed in claim 12, wherein the balancing weight is integral with the balancing shaft.

16. An engine as claimed in claim 12, further including a second connecting rod assembly connected at one end to the crankshaft.

17. An engine as claimed in claim 12, wherein the balancing shaft is coupled to the crankshaft so that rotation of the crankshaft drives rotation of the balancing shaft.

18. An engine as claimed in claim 12, further comprising a rib integral with the balancing shaft.

19. An engine as claimed in claim 18, further comprising a recess in the rib such that when the crankshaft and balancing shafts rotate the recess provides clearance for the connecting rod assembly so that the connecting rod assembly does not substantially interfere with the rib.

20. The motorcycle of claim 12, wherein:
   the crankshaft rotates about a first rotational axis;
   the balancing shaft rotates about a second rotational axis spaced a distance r from the first rotational axis; and
   the distance r is such that the connecting rod assembly would interfere with the balancing weight during rotation of the crankshaft if the recess was eliminated.

21. An engine as claimed in claim 20, wherein the first and the second rotational axes are substantially parallel.

22. A motorcycle as claimed in claim 12, wherein the connecting rod defines a path during rotation of the crankshaft, the path passing through at least a portion of the recess.

23. A method of operating an internal combustion engine having a rotatable crankshaft, a connecting rod assembly coupled to the crankshaft for rotation therewith, and a rotatable balancing shaft spaced from the crankshaft and including a balancing weight, the balancing weight having a recess defined therein, the method comprising:
   rotating the crankshaft;
   rotating the balancing shaft; and
   passing a portion of the connecting rod assembly through the recess in the balancing weight as the crankshaft and the balancing shaft rotate.

24. The method as claimed in claim 23, further comprising passing a portion of the connecting rod assembly through a rib.

* * * * *